United States Patent
Denton et al.

(10) Patent No.: US 6,837,323 B2
(45) Date of Patent: Jan. 4, 2005

(54) VARIABLE SHIFT SCHEDULE CONTROL

(75) Inventors: Daniel Denton, Oakland County, MI (US); Shawn Swales, Canton, MI (US)

(73) Assignee: Visteon Global Technologies Inc., Dearborn, MI (US)

( * ) Notice: Subject to any disclaimer, the term of this patent is extended or adjusted under 35 U.S.C. 154(b) by 150 days.

(21) Appl. No.: 10/172,105

(22) Filed: Jun. 14, 2002

(65) Prior Publication Data

US 2003/0000751 A1 Jan. 2, 2003

Related U.S. Application Data

(60) Provisional application No. 60/299,018, filed on Aug. 18, 2001.

(51) Int. Cl.[7] .................................................. B60K 1/00
(52) U.S. Cl. ...................................... 180/65.4; 180/65.7
(58) Field of Search ............................. 180/65.7, 65.2, 180/65.3, 65.4; 701/54, 55, 56, 64; 477/3, 154, 155

(56) References Cited

U.S. PATENT DOCUMENTS

| | | | | |
|---|---|---|---|---|
| 4,905,544 A | * | 3/1990 | Ganoung | ..................... 477/109 |
| 5,045,035 A | * | 9/1991 | Ganoung | ..................... 475/42 |
| 5,343,970 A | | 9/1994 | Severinsky | |
| 5,656,921 A | | 8/1997 | Farrall | |
| 5,713,425 A | | 2/1998 | Buschhaus et al. | |
| 5,873,426 A | | 2/1999 | Tabata et al. | |
| 6,054,844 A | | 4/2000 | Frank | |
| 6,090,007 A | | 7/2000 | Nakajima et al. | |
| 6,164,400 A | | 12/2000 | Jankovic et al. | |
| 6,181,020 B1 | | 1/2001 | Uchida et al. | |
| 6,196,344 B1 | | 3/2001 | Tamor | |
| 6,209,672 B1 | | 4/2001 | Severinsky | |
| 6,233,508 B1 | | 5/2001 | Deguchi et al. | |
| 6,317,665 B1 | * | 11/2001 | Tabata et al. | ................. 701/22 |
| 6,359,404 B1 | | 3/2002 | Sugiyama et al. | |
| 6,371,878 B1 | | 4/2002 | Bowen | |
| 6,503,170 B1 | * | 1/2003 | Tabata | ......................... 477/97 |
| 6,547,697 B1 | * | 4/2003 | Taffin et al. | ................. 477/109 |
| 6,617,703 B2 | * | 9/2003 | Matsubara et al. | ....... 290/40 C |
| 6,634,982 B2 | * | 10/2003 | Miki et al. | ..................... 477/45 |
| 6,672,415 B1 | * | 1/2004 | Tabata | ....................... 180/65.2 |
| 2001/0019980 A1 | | 9/2001 | Kanehisa | |
| 2001/0023790 A1 | | 9/2001 | Hasegawa | |

OTHER PUBLICATIONS

"Variable Shift Schedule Control for Integrated Starter Generator Equipped Hybrid Vehicles," Daniel S. Denton, Society of Automotive Engineers, Inc., 2001, 6 pages.

* cited by examiner

Primary Examiner—Christopher P. Ellis
Assistant Examiner—Bridget Avery
(74) Attorney, Agent, or Firm—Brinks Hofer Gilson & Lione

(57) ABSTRACT

A method for shifting from a first gear ratio to a second gear ratio in a vehicle is provided. The method includes defining a variable shift schedule comprising at least two gear ratio change parameters. The gear ratio parameters are defined by a pair of engine variables relating to vehicle performance. The method also includes measuring the pair of engine variables to obtain values indicative of vehicle performance for the first gear ratio. The method further includes comparing the values to the two gear ratio change parameters to detect a variable shift condition known to require changing of the first gear ratio. The method also includes shifting from the first gear ratio to the second gear ratio when the variable shift condition is detected.

10 Claims, 11 Drawing Sheets

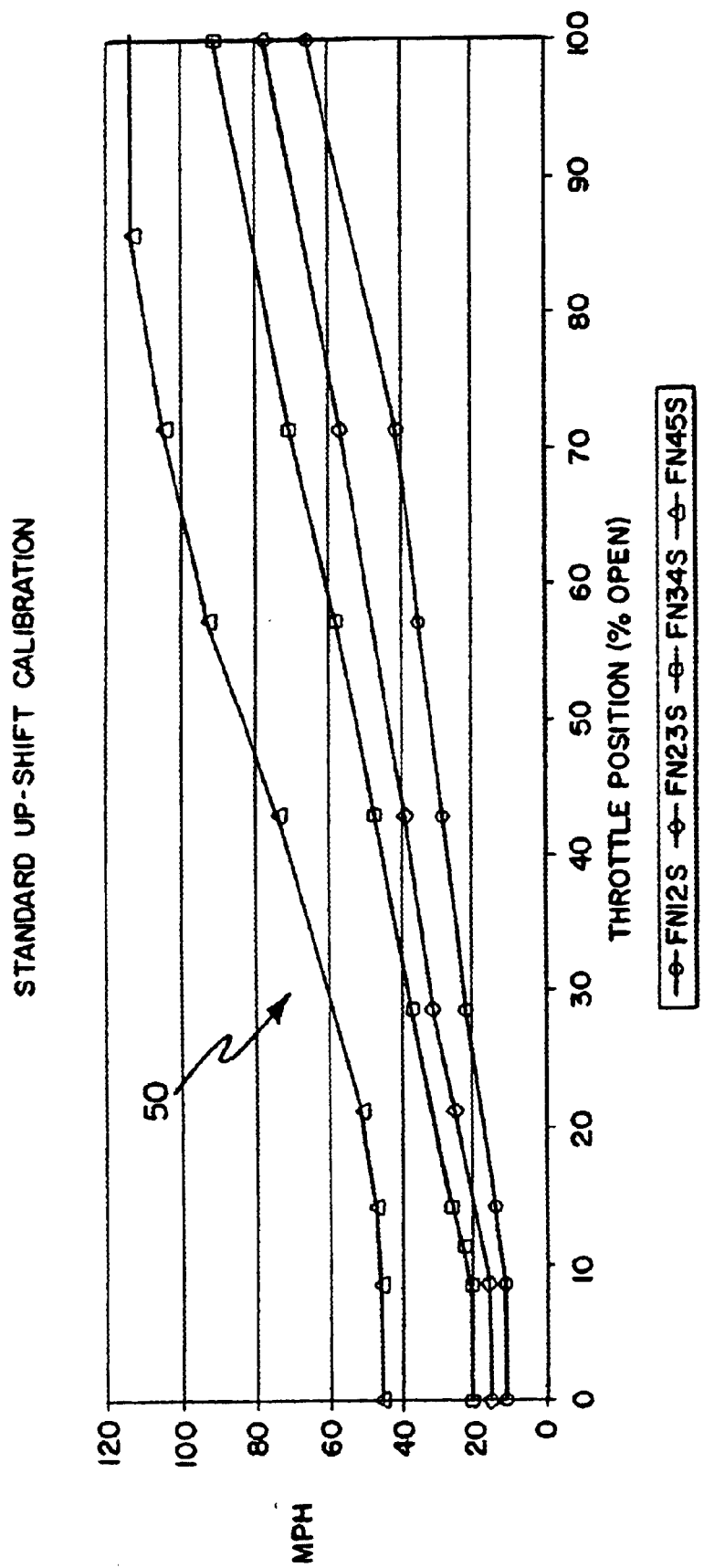

VARIABLE SHIFT SCHEDULE CONTROL

RELATED APPLICATION

This application claims the benefit of the filing date pursuant to 35 U.S.C. §119(e) of Provisional Application Ser. No. 60/299,018, filed Jun. 18, 2001, the disclosure of which is hereby incorporated by reference.

FIELD OF THE INVENTION

The present invention relates generally to a transmission control strategy. More particularly, it relates to a variable shift schedule control strategy that allows an automatic transmission to make clutch engagements variably, thereby resulting in ratio changes at lowered engine speeds and earlier torque converter element locks while maintaining relatively constant output torque.

BACKGROUND

Worldwide demand for vehicles that perform under greater fuel economy and produce fewer environmental pollutants has spurred the automotive industry to research and produce vehicles with alternative power-train architectures, including the hybrid-electric vehicle (HEV). Most HEV power-trains have two separate modes of producing torque and power, a conventional internal combustion engine and an electric motor powered by some type of electrical energy storage unit, such as a battery. Generally, the HEV has been successful in delivering greater fuel economy and lowered emissions than conventional internal combustion engines by utilizing a downsized internal combustion engine and augmenting the engine torque through the electric motor when necessary.

Among the disadvantages of known power-train architectures for HEVs are relatively low performance values in torque, horsepower and acceleration. In order to overcome these disadvantages, particularly in large vehicles that are subject to more demanding duty cycles such as towing, it is known that a sizeable electric motor, typically 25 kW or greater, and comparably large energy storage units could be utilized to meet higher torque and power demands. However, the weight penalty for these larger electric motors and energy storage units would largely offset the benefits typically associated with the HEV, including increased fuel economy and lowered emissions.

In the area of alternative HEV power-train architectures, there continues to be a need for a control strategy that allows the power-train to generate increased torque and power while still providing lowered emissions and increased fuel economy.

SUMMARY

In one aspect of the invention, a method for shifting from a first gear ratio to a second gear ratio in a vehicle is provided. The method includes defining a variable shift schedule comprising at least two gear ratio change parameters. The gear ratio parameters are defined by a pair of engine variables relating to vehicle performance. The method also includes measuring the pair of engine variables to obtain values indicative of vehicle performance for the first gear ratio. The method further includes comparing the values to the two gear ratio change parameters to detect a variable shift condition known to require changing of the first gear ratio. The method also includes shifting from the first gear ratio to the second gear ratio when the variable shift condition is detected.

In another aspect of the invention, a method for shifting from a first gear ratio to a second gear ratio using an automatic transmission in a vehicle is provided. The vehicle has an engine and an auxiliary boost source for augmenting the torque produced by the engine. The method includes defining a variable shift schedule comprising at least two gear ratio change parameters. The gear ratio parameters are defined by a pair of engine variables relating to vehicle performance. The method also includes measuring the pair of engine variables to obtain values indicative of vehicle performance for the first gear ratio. The method further includes comparing the values to the two gear ratio change parameters to detect a variable shift condition known to require changing of the first gear ratio. The method also includes calculating a first boost torque necessary to maintain approximately constant output torque before and after changing the first gear ratio. In addition, the method includes calculating a second boost torque available from the auxiliary boost source. The method further includes comparing the available boost torque and the necessary boost torque to detect a steady torque condition. Further, the method includes shifting from the first gear ratio to the second gear ratio and powering the auxiliary boost source to augment torque available from the engine when the variable shift condition and the steady torque condition are detected.

In yet another aspect of the invention, a method for locking the elements of a torque converter for a gear ratio in a vehicle is provided. The method includes defining a variable shift schedule comprising at least two torque converter lock parameters. The torque converter lock parameters are defined by a pair of engine variables relating to vehicle performance. The method also includes measuring the pair of engine variables to obtain values indicative of vehicle performance for the gear ratio. The method further includes comparing the values to the two torque converter lock parameters to detect a variable lock condition known to require locking of said torque converter elements. The method also includes locking said torque converter elements when the variable shift condition is detected.

In another aspect of the invention, another method for locking the elements of a torque converter in a gear ratio using an automatic transmission in a vehicle is provided. The vehicle has an engine and an auxiliary boost source for augmenting the torque produced by the engine. The method includes defining a variable shift schedule comprising at least two torque converter lock parameters. The torque converter lock parameters are defined by a pair of engine variables relating to vehicle performance. The method also includes measuring the pair of engine variables to obtain values indicative of vehicle performance for the gear ratio. The method further includes comparing the values to the two torque converter lock parameters to detect a variable lock condition known to require locking of said torque converter elements. The method also includes calculating a first boost torque necessary to maintain approximately constant output torque before and after locking said torque converter elements. In addition, the method includes calculating a second boost torque available from the auxiliary boost source. The method further includes comparing the available boost torque and the necessary boost torque to detect a steady torque condition. Further, the method includes locking said torque converter elements and powering the auxiliary boost source to augment torque available from the engine when the variable lock condition and the steady torque condition are detected.

BRIEF DESCRIPTION OF THE DRAWINGS

FIG. 3 is an example of a conventional shift schedule showing gear ratio change parameters for several gear ratio up-shift sequences;

FIG. 6 is a histogram chart illustrating engine operating efficiency points over an entire drive cycle for an engine using a conventional shift schedule of FIGS. 3–3a.

FIG. 7 is a histogram chart illustrating engine operating efficiency points over an entire drive cycle for an engine using the variable shift schedule of FIGS. 4–4a.

DETAILED DESCRIPTION OF THE PREFERRED EMBODIMENTS

Figure 1:
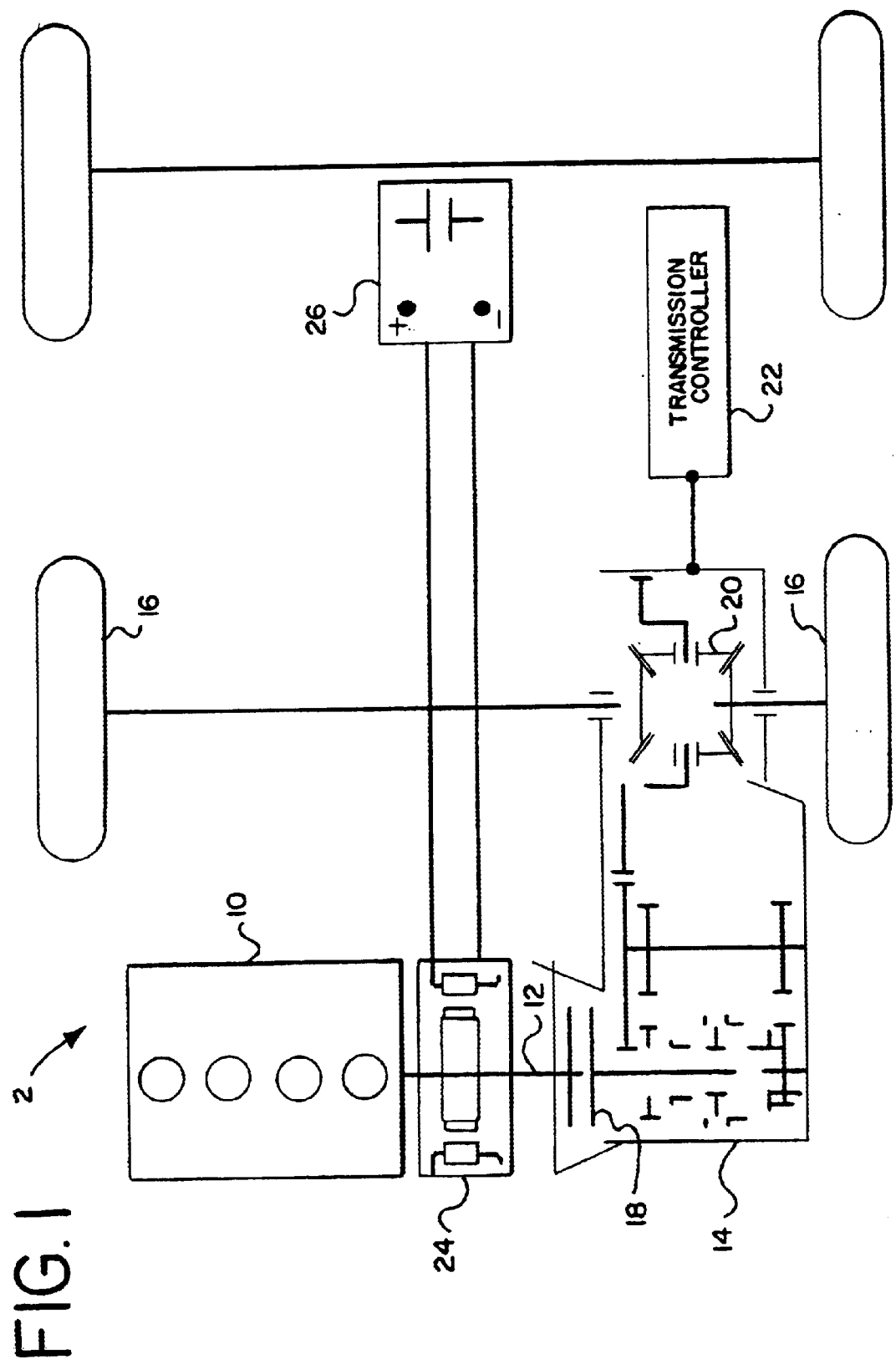
FIG. 1 is a block diagram of a power-train system for implementing a variable shift schedule control strategy in accordance with the present invention.

Referring now to the drawings, FIG. 1 is a schematic block diagram showing a power-train system 2 for implementing a variable shift schedule control strategy according to the present invention in a hybrid-electric vehicle (HEV). The HEV power-train system includes a conventional internal combustion (IC) engine 10 having an engine crankshaft 12, an automatic transmission 14 and a set of drive wheels 16. The engine crankshaft 12 is fluidly coupled to the transmission 14 via a torque converter 18. The transmission 14 is operatively connected to the drive wheels 16 through a differential gear mechanism 20 for transmitting the driving torque produced by the engine 10 to the drive wheels 16, as is well known in the art. A transmission controller 22 controls the operation of the transmission 14.

The HEV power-train system 2 further includes an electric motor preferably comprising an integrated starter alternator (ISA) motor 24 and at least one electric energy storage device 26. The ISA motor 24 can function as a direct current electric motor or as a synchronous alternator generating AC electric power for sourcing electrical loads. The ISA motor 24 has a rotor that is preferably mounted directly on the engine crankshaft 12 between the engine 10 and the torque converter 18. Accordingly, the ISA motor 24 can be energized from the electric energy storage device 26 to assist the torque output of the engine 10. Additionally, those skilled in the art will readily recognize that the ISA motor 24 may be connected to the engine crankshaft 12 in alternative ways, for example, via a mechanical rotation transmitting device such as a chain drive, a belt drive or a gear train.

For example, one HEV power-train system 2 that has been found useful includes a 4.0 liter, six cylinder gasoline engine and a 42 volt, 3 phase inverter fed induction type Integrated Starter Alternator manufactured by Visteon Corp. of MI, USA having a capacity less than about 10 kW. The Integrated Starter Alternator is powered by three series wired 12V Absorbed Glass Mat (AGM) batteries. The HEV power-train system 2 further includes a torque converter having a diameter of about 260 mm, a stall torque ratio of about 2.25, and a capacity factor (K) of about 184. Also, the power-train system includes a 5 speed electronic controlled transmission having the following gear ratios:

| Gear | Ratio |
|------|-------|
| 1    | 2.47  |
| 2    | 1.86  |
| 3    | 1.47  |
| 4    | 1.00  |
| 5    | 0.75  |

In addition, the HEV power-train system 2 utilized in the present embodiment has a final drive ratio of about 3.73 and tires for the drive wheels having about 722 revolutions per mile. However, it should be understood that the parameters for the HEV power-train system 2 described above are meant to be illustrative, rather than limiting. Those skilled in the art will recognize that other power-train systems could also implement the variable shift schedule control strategy according to the present invention.

Figure 2:
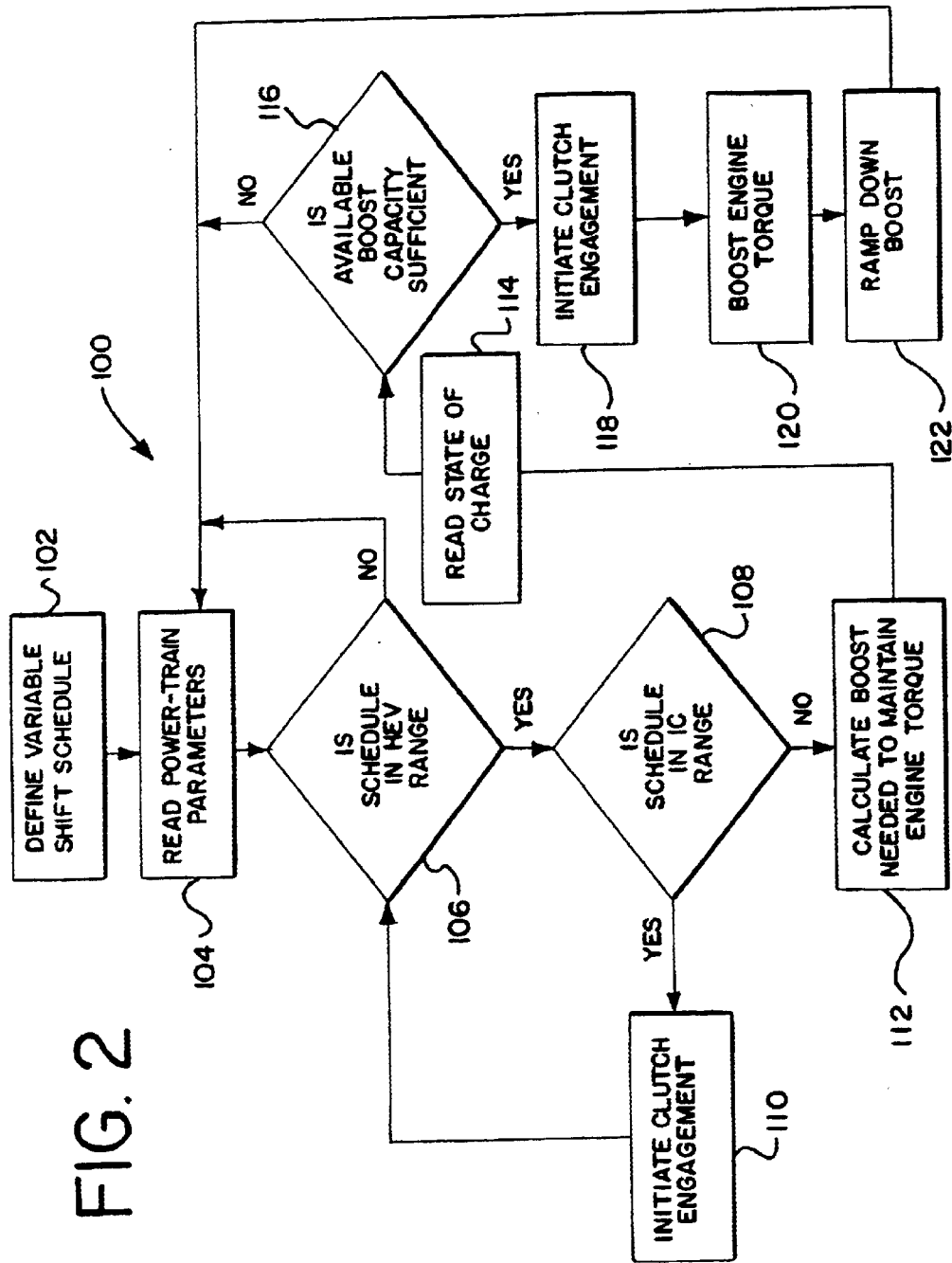
FIG. 2 is a flowchart for a method of using a variable shift schedule to make clutch engagements variably in accordance with the present invention.

Referring next to FIG. 2, one embodiment of a variable shift schedule (VSS) control strategy 100 for making clutch engagements to change gear ratios during an up-shift (changing from a higher gear ratio to a lower gear ratio) or to lock the torque converter elements will be explained. The VSS control strategy 100 is implemented in the transmission controller 22. As described in further detail below, the VSS control strategy 100 selectively utilizes additional torque available from the ISA motor 24 to allow the engine 10 to be consistently operated at reduced speeds during an up-shift sequence by changing gear ratios within the transmission 14 coupled with locking the elements of the torque converter 18 earlier than traditionally thought acceptable and still produce comparable output torque during light duty usages. When called upon by the operator for heavier usage duty cycles, the VSS control strategy 100 can utilize the full performance of the engine 10 along with the additional torque available from the ISA motor 24. This produces a power-train architecture that has increased fuel efficiency, lowered emissions and higher performance levels.

Figure 3A:
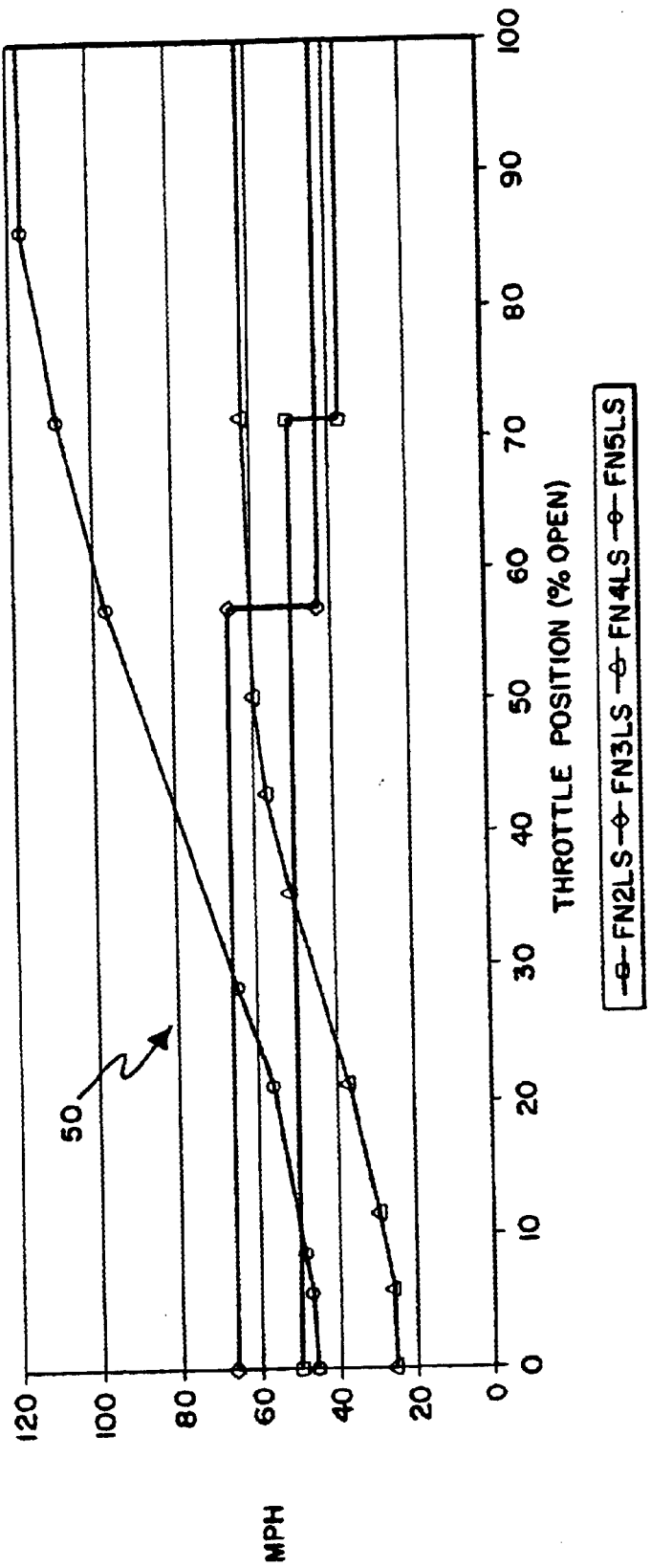
FIG. 3a displays torque converter lock parameters for several torque converter lock sequences for the conventional shift schedule of FIG. 3.

With the advent of fully electronic transmission controls, calibration engineers have been given the ability to continuously define gear ratio change and torque converter element locking parameters for a vehicle equipped with an automatic transmission. Traditionally, one gear ratio change parameter is established for each gear ratio shift sequence (a change between consecutive gear ratios) through the creation of a table or shift schedule that sets a pair of engine variables relating to vehicle performance against each other. A typical shift schedule will set vehicle speed against throttle position (driver demand), for example. FIG. 3 illustrates a conventional shift schedule 50 for four gear ratio up-shift sequences by plotting throttle position, measured in percent open, against vehicle speed, measured in miles per hour. Likewise, one torque converter lock parameter is established for each torque converter lock and unlock sequence, as shown in FIG. 3a.

A typical control system uses the gear ratio change parameters chosen by the calibrator to determine the vehicle speed at which a transmission should change gear ratios for a given throttle position. Specifically, during an up-shift sequence, any time the vehicle speed is above the value for which it was calibrated at the given throttle position, the control system requests a change to the next higher consecutive gear ratio. Referring to the example of the conventional shift schedule 50 shown in FIG. 3, a transmission will shift from first to second gear at a throttle position of 40% open once the vehicle speed climbs above about 28 mph.

Similarly, a typical control system uses the torque converter lock parameters to determine the vehicle speed at which a transmission should lock the torque converter elements. By "locking" the torque converter, the engine crankshaft 12 is mechanically coupled directly to the transmission 14.

In the present embodiment, the VSS control strategy 100 first defines 102 a variable shift schedule 52 that includes a pair of gear ratio change parameters for each gear ratio up-shift sequence, as shown in FIG. 2. In effect, the VSS control strategy 100 defines a variable shift schedule that allows the calibrator to create a variable range to command the shifting from a current gear ratio to the next gear ratio by utilizing two gear ratio change points for a given vehicle speed and throttle position. The variable shift schedule also includes a pair of torque converter lock parameters for each torque converter lock sequence, creating a variable range to command the locking of the torque converter elements.

Figure 4:
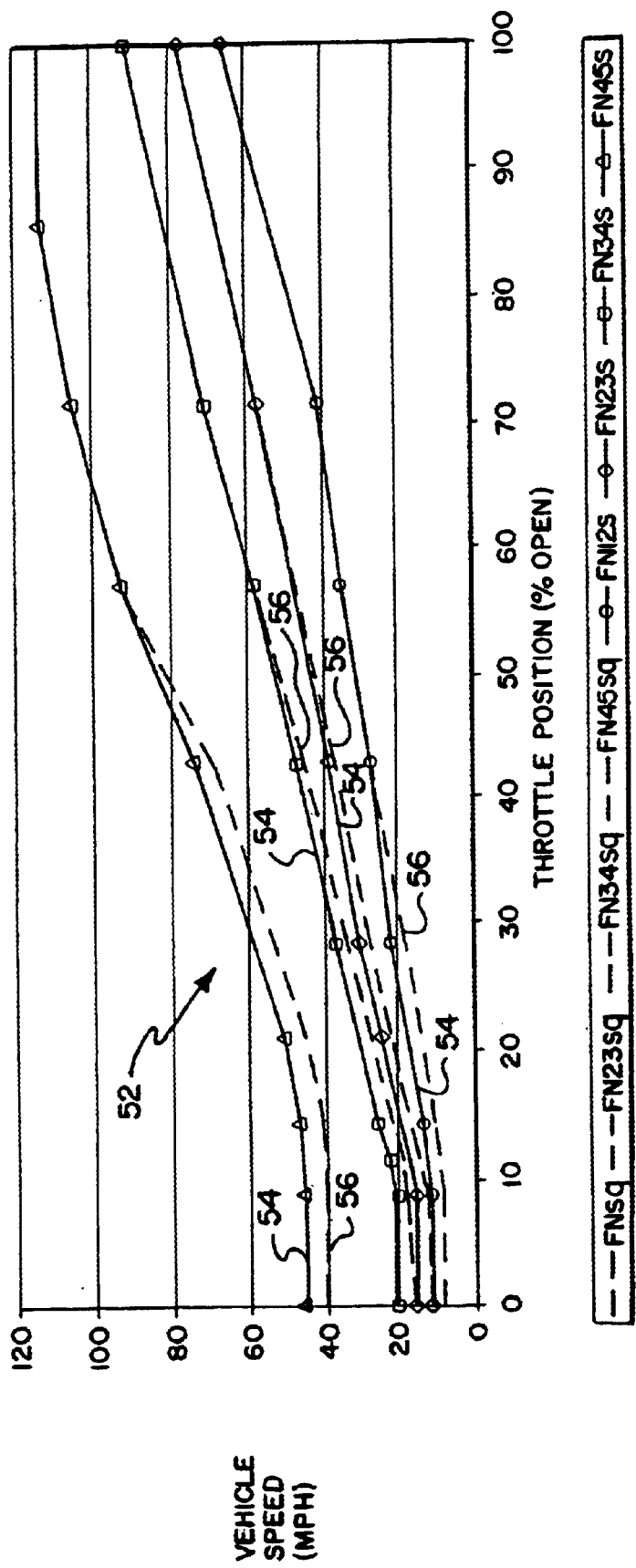
FIG. 4 is an example of a variable shift schedule in accordance with the present invention showing gear ratio change parameters for several gear ratio up-shift sequences.
Figure 4A:
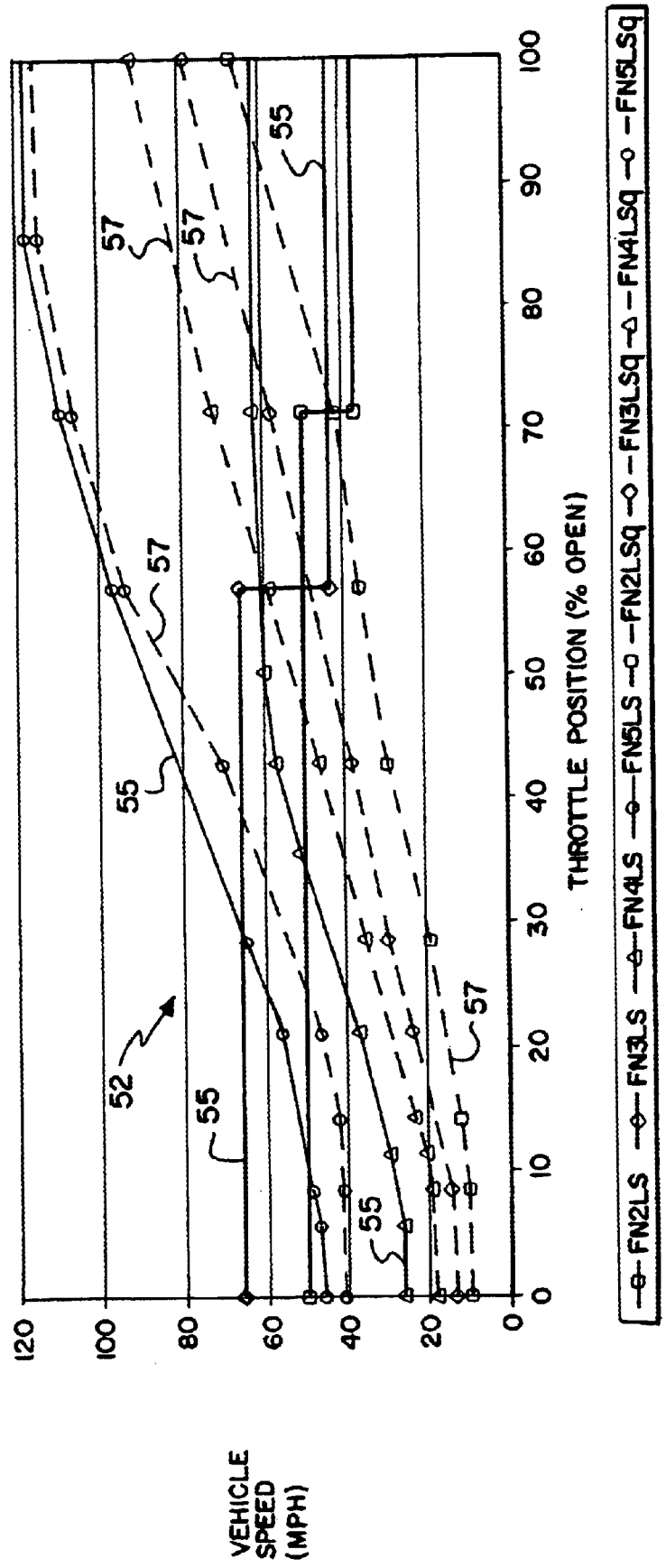
FIG. 4a displays torque converter lock parameters for several torque converter lock sequences for the variable shift schedule of FIG. 4.

For example, FIGS. 4 and 4a display a variable shift schedule 52 that was found useful in conjunction with the HEV power-train system 2 described above. Again, the gear ratio change and torque converter lock parameters are defined by a pair of variables relating to vehicle performance, including vehicle speed and throttle position. Those skilled in the art will readily recognize that the variable shift schedule 52 can define the gear ratio change and torque converter lock parameters using other performance based parameters, for example, engine speed or engine torque output instead of vehicle speed and pedal position instead of throttle position.

In particular, for each gear ratio up-shift sequence, the variable shift schedule 52 includes an IC gear ratio change parameter 54, VSS gear ratio change parameter 56, IC torque converter lock parameter 55 and VSS torque converter lock parameter 57. The IC gear ratio change parameter 54 and the IC torque converter lock parameter 55 preferably define a set of gear ratio change points and a set of torque converter lock points respectively that are utilized in a conventional power-train architecture having an IC engine 10 only. The VSS gear ratio change parameter 56 preferably defines a set of lower gear ratio change points that allow the transmission 14 of the HEV power-train system 2 to up-shift gear ratios at lower vehicle speeds. The VSS torque converter lock parameter 57 preferably defines a set of lower torque converter lock points that allow the transmission 14 of the HEV power-train system 2 to lock the torque converter elements at lower vehicle speeds.

As described below, a reduction in the speed of the IC engine 10 during a gear ratio change and, conversely, the ability of the transmission 14 to remain in higher gear ratio ranges for longer durations, coupled with torque converter elements that can be locked more often, creates a power-train having increased efficiency and lowered emissions.

Figure 5:
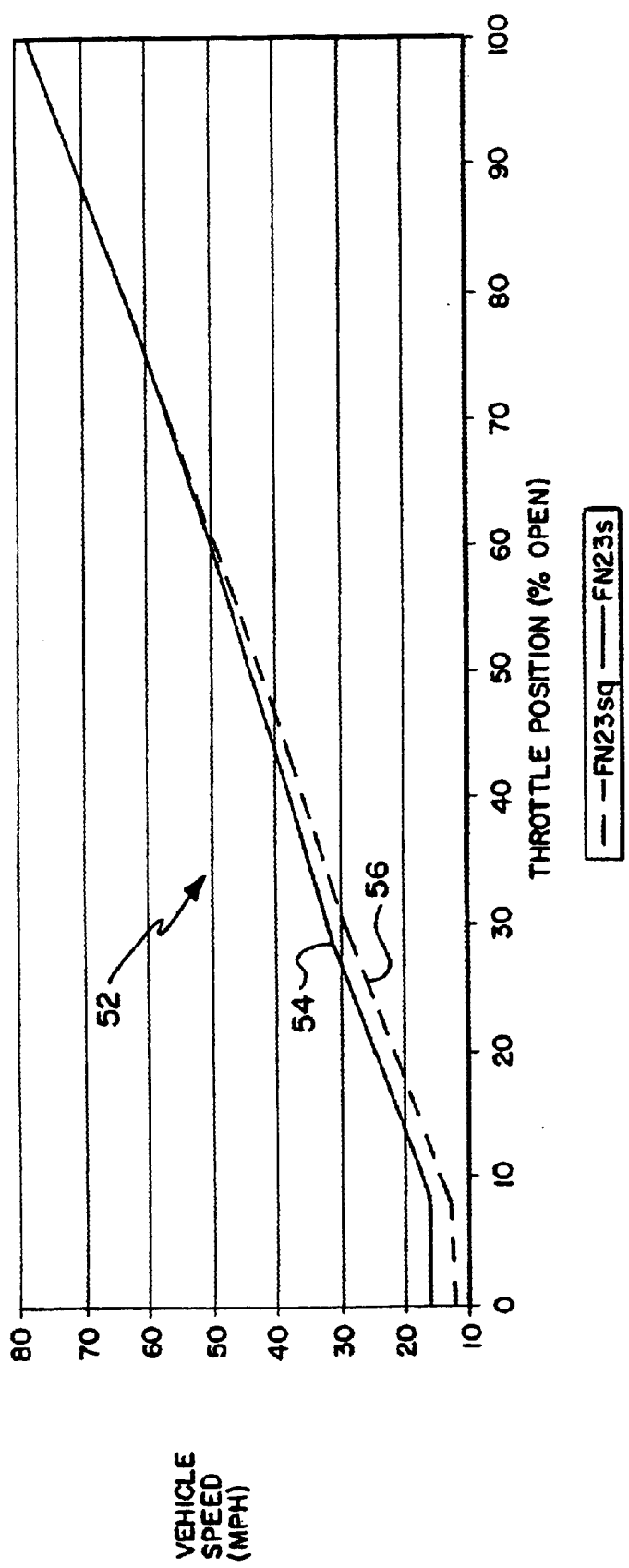
FIG. 5 displays a pair of gear ratio change parameters for one of the gear ratio shift sequences from the variable shift schedule of FIG. 4.

For example, FIG. 5 displays the pair of gear ratio change parameters 54 and 56 from the variable shift schedule 52 that are utilized for a "2–3" up-shift. The upper curve that intercepts the "Y" axis at about 16 mph represents the conventional IC gear ratio change parameter 54 utilized in conventional power-train architecture having an IC engine only. The lower curve that intercepts the "Y" axis at 12 mph describes the earliest VSS gear ratio change parameter 56 for the HEV power-train system 2. At a throttle position setting of about 30%, the transmission 14 would shift from second gear to third gear when the vehicle reaches about 32 mph, according to the IC gear ratio change parameter 54. Similarly, at a throttle position setting of about 30%, the transmission 14 could shift from second gear to third gear when the vehicle reaches about 29 mph, according to the earliest VSS gear ratio change parameter 56. The corresponding difference in speed of the IC engine 10 can be calculated according to the following equation:

$$N_E = N_V * TRM/60 * FDR * GR/SR, \text{ where}$$

$N_E$=Engine Speed (RPM)
$N_V$=Vehicle Speed (MPH)
TRM=Tire Revolutions Per Mile
FDR=Final Drive Ratio
GR=Transmission Gear Ratio
SR=Torque Converter Speed Ratio Accordingly, the 3 mph difference between the vehicle speeds at which the transmission 14 performs a "2–3" up-shift translates into a reduction of speed for the IC engine 10 from about 3340 rpm to about 3025 rpm in the present embodiment, where a torque converter speed ratio of 0.8:1 is assumed. Those skilled in the art will recognize that this reduction in engine speed would result in a decrease in fuel consumption of approximately 1 kg/hour for the engine 10 utilized in the present embodiment.

Similarly, at a throttle position setting of about 30%, the transmission 14 would lock the torque converter elements while in third gear only if the vehicle reaches about 66 mph, according to the IC torque converter lock parameter 55. On the other hand, the transmission 14 could lock the torque converter elements while in third gear when the vehicle reaches about 30 mph at a throttle position setting of about 30% using the earliest VSS torque converter lock parameter 55.

By "locking" the torque converter earlier, the engine is brought to the same speed as the transmission while torque multiplication through the torque converter is eliminated. When the torque converter elements are locked together rather than fluidly coupled, slippage is eliminated and the transfer of energy from the engine to the drive wheels becomes more efficient. Therefore, the power-train system 2 can be more efficient over a greater range of vehicle speeds when using the VSS torque converter lock parameter 55.

Figure 6:
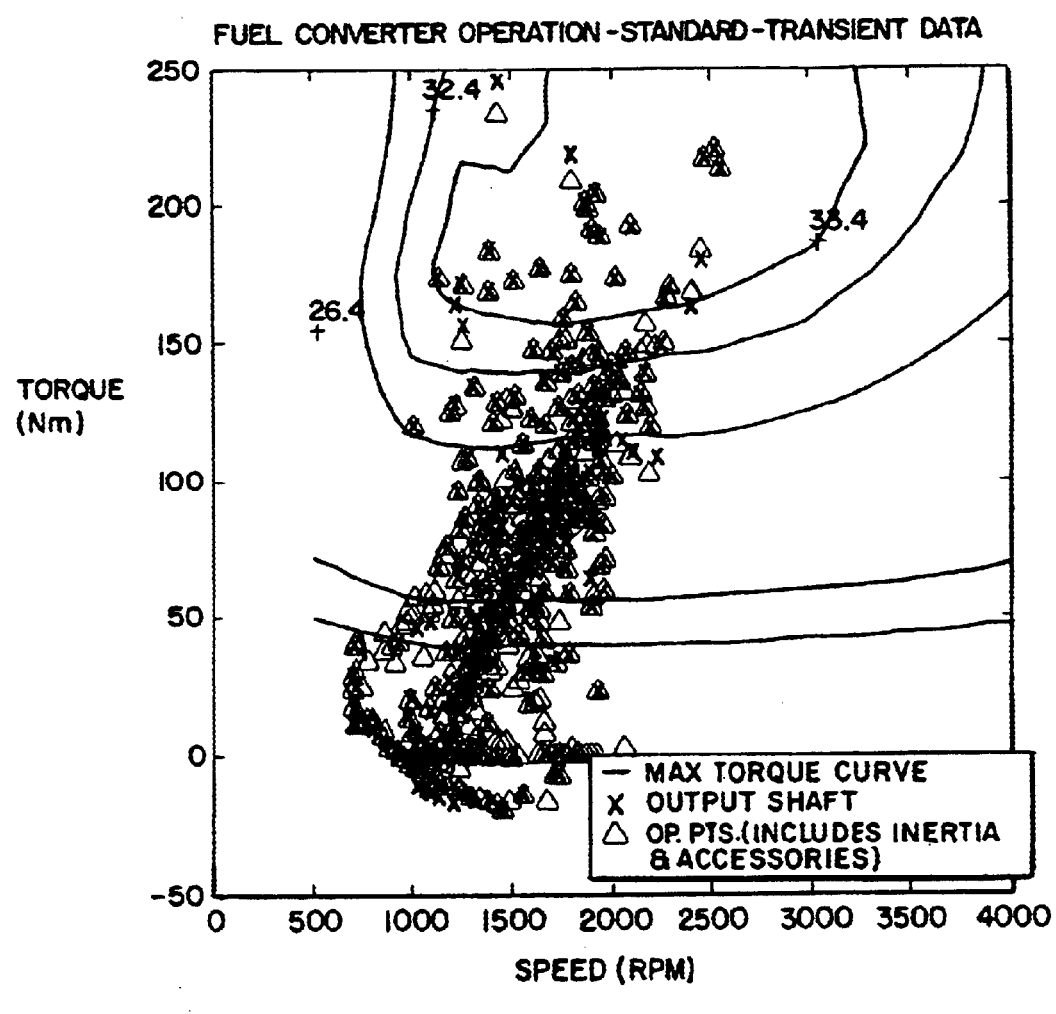
Figure 7:
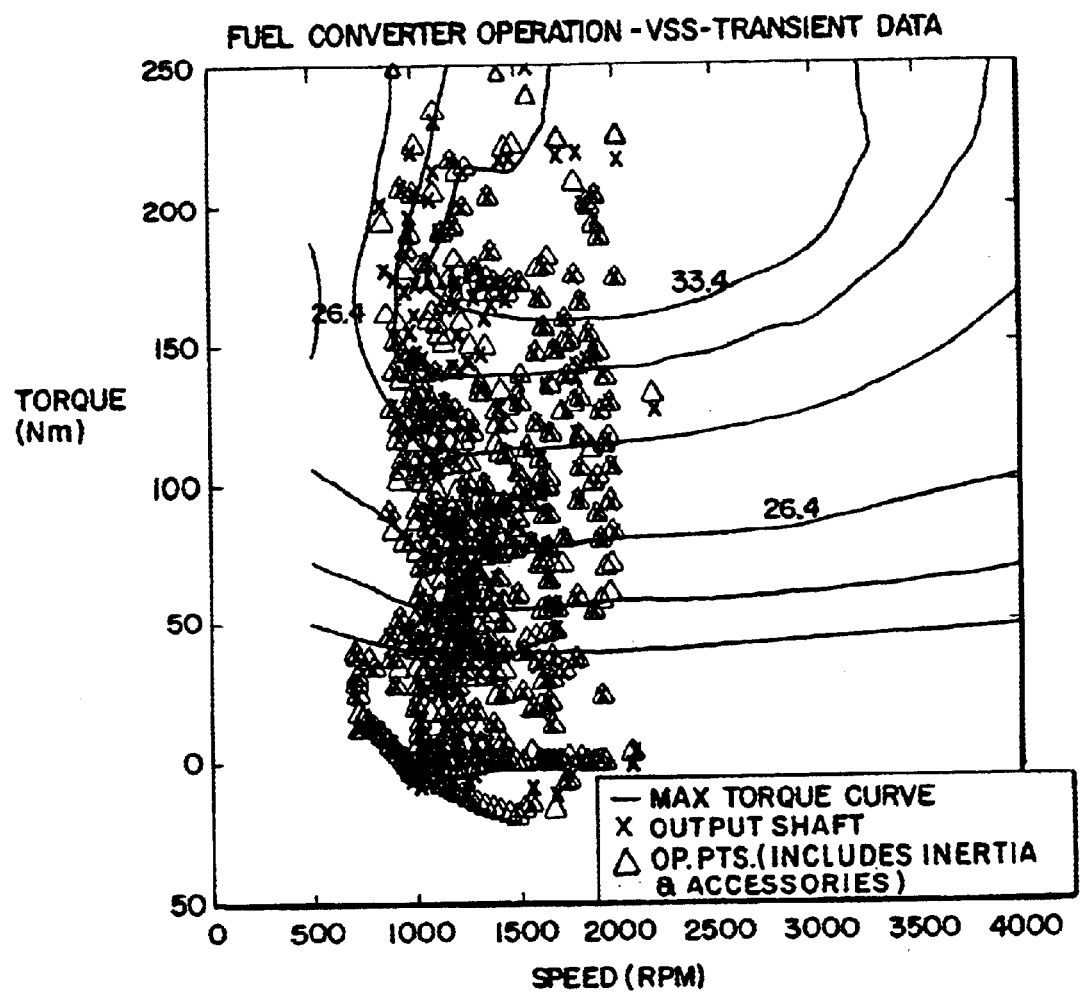

For example, the histogram charts shown in FIGS. 6 and 7 illustrate the increase in engine operating efficiency points over an entire drive cycle for the engine 10 utilized in the present embodiment when utilizing the variable shift schedule 52 instead of the corresponding conventional shift schedule.

However, simply lowering the vehicle speed and thus the engine speed at which the transmission 14 changes gear ratios or locks the torque converter elements could impact the overall performance of the vehicle, in particular, the output torque or tractive effort available at the drive wheels of the vehicle. The tractive effort is calculated using the following formula:

$$TE = T_{Enet} * TR * GR * FDR, \text{ where}$$

TE=Tractive Effort (lb-ft)
$T_{Enet}$=Net Engine Torque (lb-ft)

TR=Torque Converter Torque Ratio
GR=Transmission Gear Ratio
FDR=Final Drive Ratio Those skilled in the art will recognize that the net engine torque, $T_{Enet}$, can be obtained from known tables setting engine torque against engine speed for a particular type of internal combustion engine.

Figure 8:
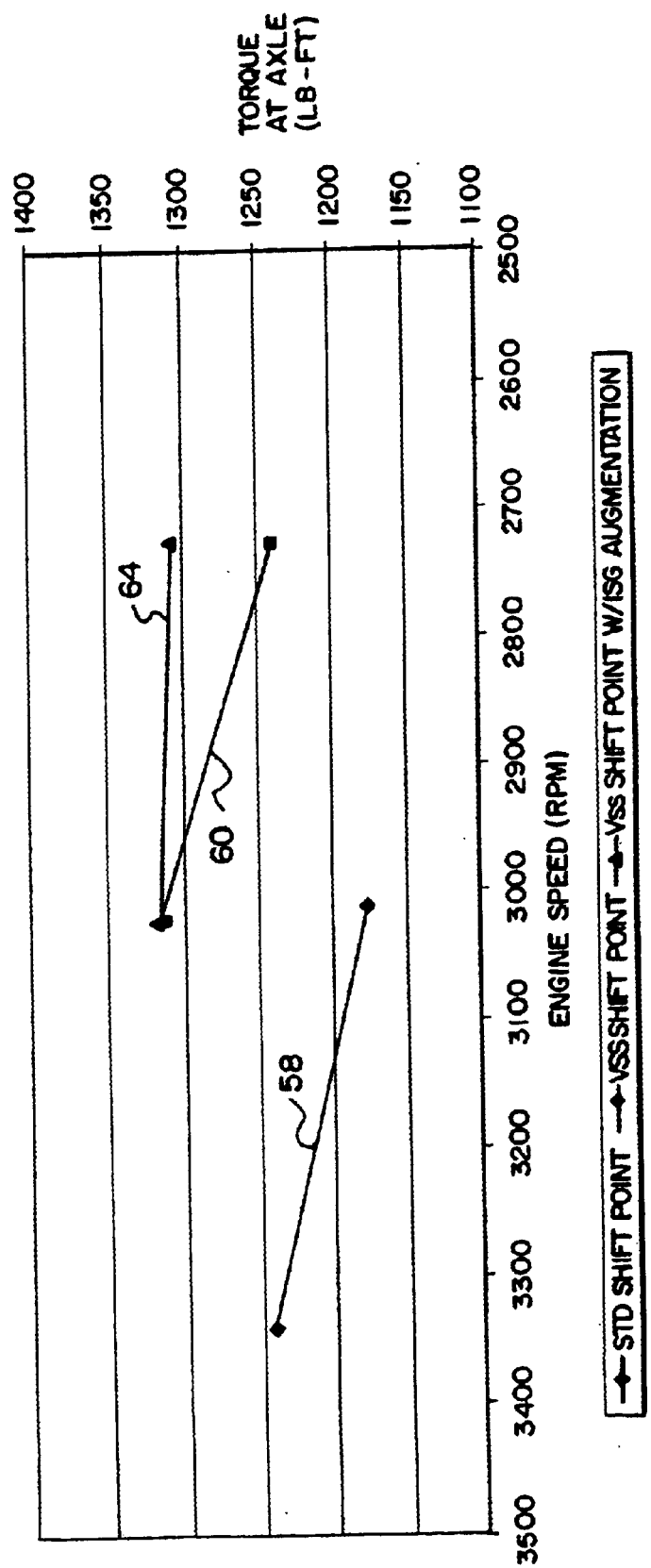
FIG. 8 is a chart illustrating the difference in tractive effort with and without an additional boost torque for the gear ratio shift sequence of FIG. 5.

For example, the difference in tractive effort that occurs when the transmission 14 performs the "2–3" up-shift discussed above using the variable shift schedule 52 is shown in FIG. 8. The negatively sloping delta curve 58 corresponds to the tractive effort generated when the transmission 14 performs the "2–3" up-shift using the conventional IC gear ratio change parameter 54 at an engine speed of about 3340 rpm. It shows a decrease in tractive effort of about 65 ft-lb. A vehicle operator will perceive this decrease in torque as a loss of vehicle power. The negatively sloping curve 60 illustrates a decrease in output torque of about 75 ft-lb for an engine speed of 3025 rpm corresponding to the lowered shift point of the VSS ratio change parameter 56 during the "2–3" up-shift. This increased drop in output torque results in a decreased acceleration rate for the vehicle. As a result, an operator would perceive an even greater loss in power for the vehicle using the VSS ratio change point as compared to the conventional shift point. It should be noted that these calculations assumed a torque converter speed ratio of approximately 0.8:1 pre-shift and 0.7:1 post-shift.

Therefore, it is desirable that the VSS control strategy 100 provide at least a constant tractive effort during clutch engagements to change gear ratios and lock the torque converter elements in order to maintain an approximately smooth acceleration during the ratio change. Accordingly, each VSS gear ratio change parameter 56 and VSS torque converter lock parameter 57 of the variable shift schedule 52 preferably defines gear ratio change points and a torque converter lock points such that a fully energized ISA motor 24 could provide sufficient boost torque to augment the torque output of the internal combustion engine 10 to maintain an approximately constant tractive effort during the gear ratio change.

Figure 9:
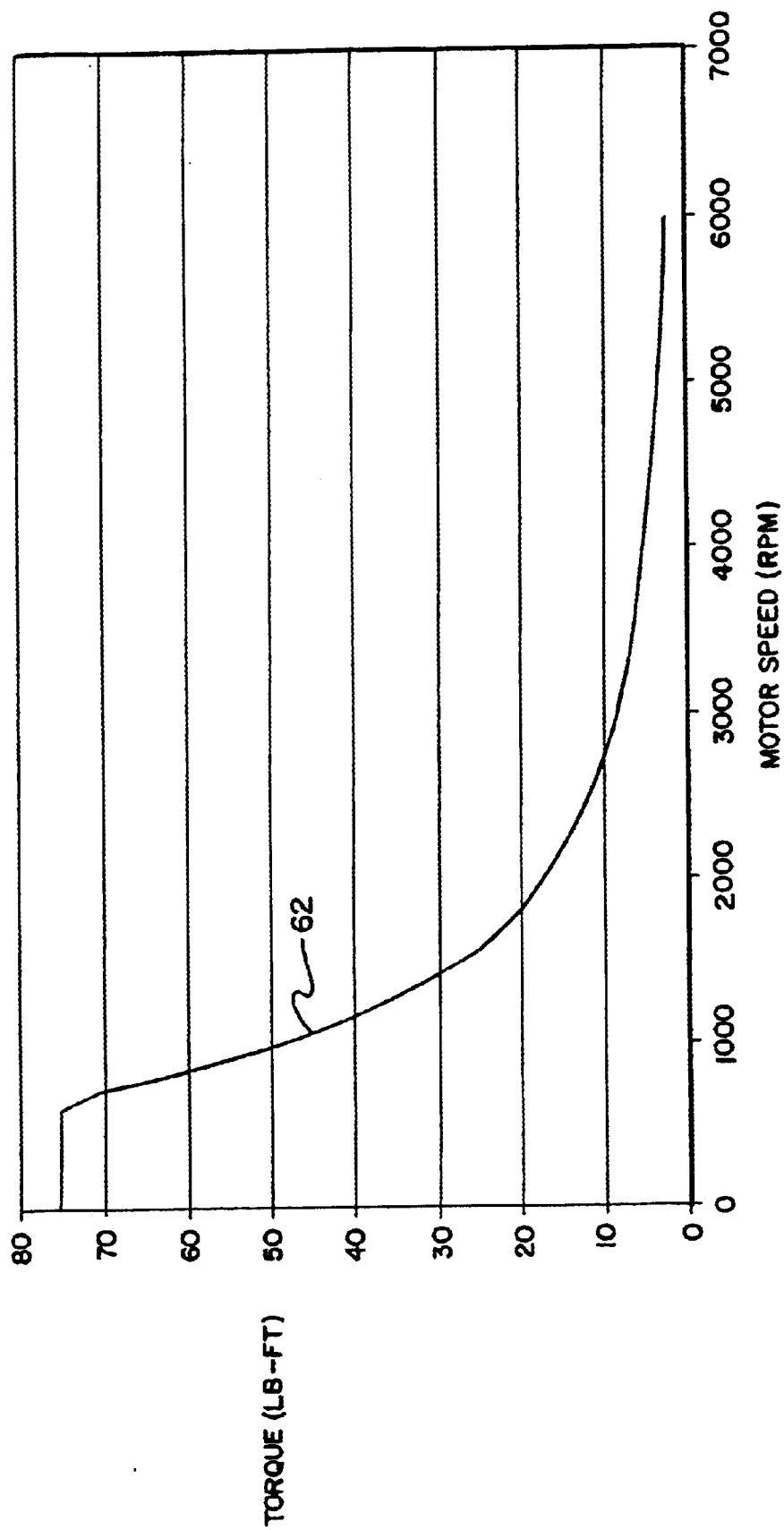
FIG. 9 is a chart illustrating the torque available from an integrated starter alternator utilized in the power-train system of FIG. 1.

For example, FIG. 9 illustrates the torque curve 62 for the ISA motor 24 used in the present embodiment. Following the gear ratio change for a "2–3" up-shift in the present embodiment, the speed of the IC engine 10 can be calculated as explained above and is about 2730 rpm. As shown in FIG. 9, the torque produced by the ISA motor 24 at this speed is about 10 lb-ft, which translates into an additional tractive effort of 65 lb-ft. Referring next to the relatively flat curve shown in FIG. 6, the additional tractive effort from the ISA motor 24 results in a relative constant tractive effort or output torque 64 for the HEV power-train system during the "2–3" up-shift sequence, as shown in FIG. 6. Therefore, as a result of the additional torque available from the ISA motor 24, the HEV power-train system can provide an approximately constant rate of acceleration for the vehicle during a proposed gear ratio change, which is then essentially unperceivable by the operator.

However, the ISA motor 24 may not always produce torque at its full capacity. The amount of torque that can be produced by the ISA motor 24 is directly related to the capability of the electric energy storage device 26 to deliver electric energy. Therefore, the torque available from the ISA motor 24 is limited by the state of charge (SOC) of the electric energy storage device 26. The VSS control strategy 100 monitors the SOC as described below in order to select the optimal point for making a clutch engagement variably between the IC and VSS gear ratio change parameters 54 and 56 as well as the IC and VSS torque lock parameters 55 and 57.

Referring again to FIG. 2, in order to determine whether the transmission should make clutch engagements for changing gear ratios or locking the torque converter elements based on the variable shift schedule defined at 102, the transmission controller reads the present vehicle speed and present throttle position 104. The moving speed of the vehicle is measured using a vehicle speed sensor 70, such as an encoder mounted on at least one of the drive wheels of the vehicle. The throttle position, which is indicative of the torque demanded by the driver, is measured using a throttle position sensor 72 or a pedal sensor for measuring the distance traveled by the throttle pedal of the vehicle.

The transmission controller then compares the present vehicle speed with the vehicle speed value from the variable shift schedule corresponding to the VSS gear ratio change parameter and the VSS torque converter lock parameter at the measured throttle position 106. The transmission controller also compares the present vehicle speed with the vehicle speed value corresponding to the IC gear ratio change parameter and the IC torque converter lock parameter at the measured throttle position 108.

If the present vehicle speed is in a range greater than the calibrated vehicle speed value corresponding to the IC torque converter lock parameter, the transmission controller simply locks the torque converter elements for the present gear 110. Likewise, if the present vehicle speed is in a range greater than the calibrated vehicle speed value corresponding to the IC gear ratio change parameter, the transmission controller simply initiates an up-shift to the next gear ratio 110.

However, if the present vehicle speed falls in the range between the calibrated values for the IC and VSS gear ratio change parameters, the VSS control strategy determines whether it can utilize the ISA motor 24 to sufficiently augment the torque produced by the IC engine 10 during the proposed gear ratio change, as described in more detail below. Similarly, if the present vehicle speed falls in the range between the calibrated values for the IC and VSS torque converter lock parameters, the VSS control strategy determines whether the ISA motor 24 could sufficiently augment the torque produced by the IC engine 10 if the elements of the torque converter are locked.

First, the transmission controller determines the additional boost or torque needed to maintain an approximately constant rate of acceleration for the HEV during the proposed gear ratio change or torque converter lock sequence 112 by calculating the difference in tractive effort or output torque produced from the engine prior to and after the proposed clutch engagement. In order to calculate present output torque, the transmission controller calculates the present engine torque from the present engine speed using a lookup table containing engine torque data measured against engine speed. The present engine speed can be measured using a motor speed sensor, such as an encoder mounted on or near the engine crankshaft, or it can be calculated from the present vehicle speed measured at step 104. The transmission controller also calculates the engine speed and engine torque available following the proposed gear change using known gear ratio parameters and the data from an engine torque lookup table.

Next, the transmission controller obtains a value indicative of the state of charge (SOC) of the electric energy storage device 114. The state of charge of the electric energy storage device, which is indicative of the percentage or the ratio of the energy remaining as compared to the energy in a fully charged device, can be measured using a current sensor 74. The amount of torque available from the ISA motor is calculated using the measured SOC based on known algorithms. The transmission controller then determines whether the amount of torque available from the ISA motor is sufficient to match the additional boost necessary to maintain an approximately constant rate of acceleration during the proposed gear ratio change or torque converter lock sequence 116.

If the boost capacity of the ISA motor 24 is insufficient to maintain a constant rate of acceleration, the transmission controller returns to read the throttle position and vehicle speed 104 without performing the proposed clutch engagement.

However, if the ISA motor 24 can provide sufficient boost torque in the amount necessary to augment the engine torque and maintain the output torque approximately steady, then the transmission controller initiates the proposed clutch engagement to change a gear ratio or lock the torque converter elements 118.

Next, the transmission controller energizes the ISA motor to provide the additional boost torque 120. It then waits for a predetermined amount of time and begins to ramp down the boost torque from the ISA motor 122 by reducing its torque output linearly to the increase of engine output torque. In order to ramp down the boost torque, the transmission controller calculates the present engine torque, waits for a predetermined amount of time, and calculates the present engine torque again. It then reduces the amount of boost torque from the ISA motor by the difference in the measured engine torque until the engine torque reaches a steady level.

Therefore, the VSS control strategy 100 is able to interpolate the earliest point within the variable shift schedule for changing a gear ratio or locking the elements of the torque converter while still providing consistent vehicle acceleration. By taking full advantage of the ISA motor's torque producing capability, the VSS control strategy provides increased fuel economy and lowered emissions for the vehicle while also providing considerable torque when required to do so by the operator.

In an alternative embodiment, a VSS control strategy can utilize a variable shift schedule for down shifting the transmission 14 (changing from a lower gear ratio to a higher gear ratio). For example, a VSS control strategy could selectively utilize additional torque available from the ISA motor 24 to allow the engine 10 to be consistently operated at reduced speeds during a down-shift by changing gear ratios within the transmission 14 later than traditionally thought acceptable and still produce a smooth de-acceleration of the vehicle and comparable output torque.

Specifically, the transmission controller in the alternative embodiment could prevent a down-shift once the vehicle speed drops below a conventional IC gear ratio change parameter for a down-shift sequence. Instead, the transmission controller could keep the transmission engaged in the higher gear (corresponding to a lower gear ratio) and thus keep the engine at a lower speed until the vehicle speed drops below a lower VSS gear ratio change parameter. In addition, the transmission controller could instruct the ISA motor to provide boost torque sufficient to maintain the tractive effort constant following the down-shift at the lower vehicle speed.

Although the invention has been described and illustrated with reference to specific illustrative embodiments thereof, it is not intended that the invention be limited to those illustrative embodiments. Those skilled in the art will recognize that variations and modifications can be made without departing from the true scope and spirit of the invention as defined by the claims that follow. It is therefore intended to include within the invention all such variations and modifications as fall within the scope of the appended claims and equivalents thereof.

We claim:

1. A method for shifting from a first gear ratio to a second gear ratio using an automatic transmission in a vehicle having an engine and an auxiliary boost source for augmenting torque produced by said engine, said method comprising:

defining a variable shift schedule comprising at least two gear ratio change parameters each defined by a pair of engine variables relating to vehicle performance;

measuring said pair of engine variables to obtain values indicative of vehicle performance for said first gear ratio;

comparing said values to said at least two gear ratio change parameters to detect a variable shift condition known to require changing of said first gear ratio;

calculating a first boost torque necessary to maintain approximately constant output torque before and after changing said first gear ratio;

calculating a second boost torque available from said auxiliary boost source;

comparing said first boost torque and said second boost torque to detect a steady output torque condition;

shifting from said first gear ratio to said second gear ratio and powering said auxiliary boost source to augment torque available from said engine when said variable shift condition and said steady output torque condition are detected.

2. The method of claim 1 wherein said auxiliary boost source comprises an electric motor operably connected with said engine.

3. The method of claim 1 wherein a first engine parameter is selected from the group consisting of vehicle speed, enginespeed and engine output torque.

4. The method of claim 1 wherein a second engine parameter is selected from the group consisting of acceleration pedal position and throttle position.

5. The method of claim 2 wherein said electric motor comprises an integrated starter alternator capable of selectively operating as a starter motor for transmitting torque to the engine and as an alternator for producing electric energy.

6. A method for locking the elements of a torque converter in a gear ratio using an automatic transmission in a vehicle having an engine and an auxiliary boost source for augmenting torque produced by said engine, said method comprising:

defining a variable shift schedule comprising at least two torque converter lock parameters each defined by a pair of engine variables relating to vehicle performance;

measuring said pair of engine variables to obtain values indicative of vehicle performance for said gear ratio;

comparing said values to said at least two torque converter lock parameters to detect a variable lock condition known to require locking of said torque converter elements;

calculating a first boost torque necessary to maintain approximately constant output torque before and after locking said torque converter elements;

calculating a second boost torque available from said auxiliary boost source;

comparing said first boost torque and said second boost torque to detect a steady output torque condition;

locking said torque converter elements and powering said auxiliary boost source to augment torque available from said engine when said variable lock condition and said steady output torque condition are detected.

7. The method of claim 6 wherein said auxiliary boost source comprises an electric motor operably connected with said engine.

8. The method of claim 6 wherein a first engine parameter is selected from the group consisting of vehicle speed, engine speed and engine output torque.

9. The method of claim 6 wherein a second engine parameter is selected from the group consisting of acceleration pedal position and throttle position.

10. The method of claim 7 wherein said electric motor comprises an integrated starter alternator capable of selectively operating as a starter motor for transmitting torque to the engine and as an alternator for producing electric energy.

* * * * *

UNITED STATES PATENT AND TRADEMARK OFFICE
CERTIFICATE OF CORRECTION

PATENT NO. : 6,837,323 B2
DATED : January 4, 2005
INVENTOR(S) : Daniel Denton et al.

It is certified that error appears in the above-identified patent and that said Letters Patent is hereby corrected as shown below:

Title page,
Item [60], after "filed on" delete "Aug. 18," and substitute -- Jun. 18, -- in its place.

Signed and Sealed this

Twenty-fourth Day of May, 2005

JON W. DUDAS
*Director of the United States Patent and Trademark Office*